(12) United States Patent
Ramirez et al.

(10) Patent No.: US 12,187,893 B2
(45) Date of Patent: Jan. 7, 2025

(54) THERMOPLASTIC COMPOSITIONS, METHODS OF THEIR MANUFACTURE, AND ARTICLES THEREOF

(71) Applicant: SHPP Global Technologies B.V., Bergen Op Zoom (NL)

(72) Inventors: Laura Mely Ramirez, Evansville, IN (US); Tony Farrell, Bergen op Zoom (NL); Paul Dean Sybert, Evansville, IN (US); Remco Wirtz, Bergen op Zoom (NL)

(73) Assignee: SHPP GLOBAL TECHNOLOGIES B.V., Bergen Op Zoom (NL)

( * ) Notice: Subject to any disclaimer, the term of this patent is extended or adjusted under 35 U.S.C. 154(b) by 543 days.

(21) Appl. No.: 17/614,014

(22) PCT Filed: May 29, 2020

(86) PCT No.: PCT/US2020/035214
§ 371 (c)(1),
(2) Date: Nov. 24, 2021

(87) PCT Pub. No.: WO2020/243492
PCT Pub. Date: Dec. 3, 2020

(65) Prior Publication Data
US 2022/0220312 A1 Jul. 14, 2022

Related U.S. Application Data

(60) Provisional application No. 62/857,418, filed on Jun. 5, 2019.

(30) Foreign Application Priority Data

May 31, 2019 (EP) ..................... 19177748

(51) Int. Cl.
C08L 83/10 (2006.01)
B33Y 70/00 (2020.01)
C09D 183/10 (2006.01)

(52) U.S. Cl.
CPC .............. C08L 83/10 (2013.01); B33Y 70/00 (2014.12); C09D 183/10 (2013.01); C08L 2205/035 (2013.01)

(58) Field of Classification Search
CPC ........ C08L 83/10; C09D 183/10; B33Y 70/00
USPC ........................................ 524/141
See application file for complete search history.

(56) References Cited

U.S. PATENT DOCUMENTS

| | | |
|---|---|---|
| 7,767,738 B2 | 8/2010 | Gaggar et al. |
| 7,790,292 B2 | 9/2010 | Colborn et al. |
| 8,969,447 B2 | 3/2015 | Van Der Mee et al. |
| 9,266,541 B2 | 2/2016 | Van Der Mee et al. |
| 9,328,240 B2 | 5/2016 | Van Der Mee et al. |
| 9,352,755 B2 | 5/2016 | Van Der Mee et al. |
| 9,650,496 B2 | 5/2017 | Van Der Mee et al. |
| 9,688,842 B2 | 6/2017 | Van Der Mee et al. |
| 9,718,956 B2 | 8/2017 | Van Der Mee et al. |
| 9,982,130 B2 | 5/2018 | Sybert et al. |
| 10,081,730 B2 | 9/2018 | Lee et al. |
| 2012/0251750 A1 | 10/2012 | Sybert et al. |
| 2013/0224461 A1* | 8/2013 | van der Mee ....... C08K 5/5393 524/136 |
| 2014/0295363 A1 | 10/2014 | Sun et al. |
| 2016/0129923 A1 | 5/2016 | Van Der Mee et al. |
| 2016/0185960 A1 | 6/2016 | Van Der Mee et al. |
| 2017/0283612 A1* | 10/2017 | Sybert .................. C08L 69/005 |

FOREIGN PATENT DOCUMENTS

| | | |
|---|---|---|
| EP | 0524731 A1 | 1/1993 |
| EP | 2634219 A1 | 9/2013 |
| WO | 2013175448 A1 | 11/2013 |
| WO | 2014072923 A1 | 5/2014 |
| WO | 2015189831 A1 | 2/2015 |
| WO | 2016028960 A1 | 2/2016 |

OTHER PUBLICATIONS

European Search Report for European Application No. 19177748.1 dated Jul. 19, 2019, 8 pages.
International Search Report for International Application No. PCT/US2020/035214, International Filing Date May 29, 2020, Date of Mailing Aug. 14, 2020, 6 pages.
Written Opinion for International Application No. PCT/US2020/035214, International Filing Date May 29, 2020, Date of Mailing Aug. 14, 2020, 8 pages.

* cited by examiner

*Primary Examiner* — Deve V Hall
(74) *Attorney, Agent, or Firm* — CANTOR COLBURN LLP

(57) ABSTRACT

A thermoplastic composition includes: 40 to 75 wt % of a poly(carbonate-siloxane-arylate); 5 to 45 wt % of a poly(carbonate-siloxane) present in an amount effective to provide 0.75 to 7 wt % of siloxane units; 10 to 40 wt % of a polycarbonate homopolymer; 5 to 15 wt % of an organophosphorus compound in an amount effective to provide 0.1 to 1 wt % of phosphorus; and optionally, 0.1 to 10 wt % of an additive composition. The thermoplastic composition has a melt volume flow rate of greater than 6 $cm^3$/10 min. An article molded from the thermoplastic composition has a 2-minute integrated heat release rate of less than or equal to 65 kW-min/$m^2$ and a peak heat release rate of less than 65 kW/$m^2$ and a notched Izod impact resistance of greater than 30 kJ/$m^2$ or greater than 700 J/$m^2$.

15 Claims, No Drawings

THERMOPLASTIC COMPOSITIONS, METHODS OF THEIR MANUFACTURE, AND ARTICLES THEREOF

CROSS REFERENCE TO RELATED APPLICATIONS

This application is a National Stage application of PCT/US2020/035214, filed May 29, 2020, which claims the benefit of U.S. Provisional Application No. 62/857,418, filed Jun. 5, 2019, and European Patent Application No. 19177748.1, filed May 31, 2019 all of which are incorporated by reference in their entirety herein.

BACKGROUND

This disclosure relates to thermoplastic compositions, and in particular to thermoplastic compositions that can be used to make interior components for aircrafts, methods of manufacture, and uses thereof.

Materials for use in constructing interior aircraft components must meet stringent flammability safety requirements. Particular requirements include smoke density, flame spread, and heat release values. For example, in the United States, Federal Aviation Regulation (FAR) Part 25.853 sets forth the airworthiness standards for aircraft compartment interiors.

To date only a limited number of polycarbonate compositions are able to pass the tests set forth for interior aircraft applications. As the aircraft interior components become very thin in order to reduce the weight and cost of these components, there are increasing demands for materials that not only meet stringent flammability safety requirements when very thin, but that also have good processability and good mechanical properties, especially impact properties. Accordingly, there remains a need for low smoke and low heat release thermoplastic compositions that are useful in the manufacture of very thin parts, that can be readily thermoformed or injection molded, and that have the strength and impact properties for performance and durability. It would be a further advantage if such compositions are halogen free.

SUMMARY

A thermoplastic composition comprises: 40 to 75 wt % of a poly(carbonate-siloxane-arylate); 5 to 45 wt % of a poly(carbonate-siloxane) present in an amount effective to provide 0.75 to 7 wt % of siloxane units; 10 to 40 wt % of a polycarbonate homopolymer; 5 to 15 wt % of an organophosphorus compound in an amount effective to provide 0.1 to 1 wt % of phosphorus; and optionally, 0.1 to 10 wt % of an additive composition, wherein each amount is based on the total weight of the poly(carbonate-siloxane-arylate), poly(carbonate-siloxane), polycarbonate homopolymer, flame retardant, and optional additive composition, which does not exceed 100%; and wherein the thermoplastic composition has a melt volume flow rate of greater than 6 $cm^3/10$ min when measured in accordance with the ISO-1133-1:2011 standard at 300° C. under a load of 1.2 kg with a residence time of 300 seconds; and an article molded from the thermoplastic composition has a 2-minute integrated heat release rate of less than or equal to 65 $kW\text{-}min/m^2$ and a peak heat release rate of less than 65 $kW/m^2$ as measured using the method according to Part IV, OSU Heat Release of FAR/JAR 25.853, Amendment 25-116; and a notched Izod impact resistance of greater than 30 $kJ/m^2$ determined in accordance with ISO 180:2000 on notched 4 millimeter thick ISO bars at 23° C., with a 5.5 J hammer; a notched Izod impact resistance of greater than 700 $J/m^2$ measured on notched 3.2 mm bars at 23° C., in accordance with the ASTM-D256-10 (2018) standard.

A powder, filament, or composite comprising the thermoplastic composition is also disclosed.

An article comprising the thermoplastic composition is selected from a molded article, a thermoformed article, an extruded film, an extruded sheet, a foamed article, a layer of a multi-layer article, a substrate for a coated article, and a substrate for a metallized article, preferably wherein the article is an aircraft interior component.

A method of manufacture of an article comprises additively manufacturing the article using a powder or filament comprising the thermoplastic composition.

DETAILED DESCRIPTION

The inventors hereof have discovered that halogen-free thermoplastic compositions having balanced flow, impact properties, smoke, and heat release can be obtained by combining a poly(carbonate-siloxane-arylate) with a poly(carbonate-siloxane), a linear or branched polycarbonate homopolymer, and certain phosphorus-containing flame retardants. In particular, a combination of a poly(carbonate-siloxane-arylate) and a phosphorus-containing flame retardant can meet the smoke and heat release requirements for aircraft applications, but can have less than desirable impact properties. Adding a linear or branched polycarbonate homopolymer to the combination maintains the heat and smoke properties, but the impact resistance is still low. Further adding a small amount of a poly(carbonate-siloxane) results in compositions with an unexpected combination of high impact resistance, good ductility, good flow, and excellent flame retardance. The thermoplastic compositions can advantageously be used to make aircraft components, in particular, thin wall aircraft components meeting or exceeding governmental and aircraft manufacturer flame safety requirements.

The individual components of the thermoplastic compositions are described in more detail below.

The poly(carbonate-siloxane-arylate) comprises repeating aromatic carbonate units, siloxane units, and aromatic ester (arylate) units. The aromatic carbonate units are of formula (1):

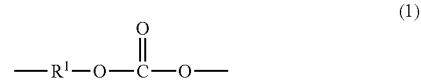

wherein at least 60 percent of the total number of $R^1$ groups are aromatic, or each $R^1$ contains at least one $C_{6-30}$ aromatic group. A combination of different $R^1$ groups can be present. The aromatic carbonate units can be derived from a dihydroxy aromatic compound such as a bisphenol of formula (2) or a diphenol of formula (3):

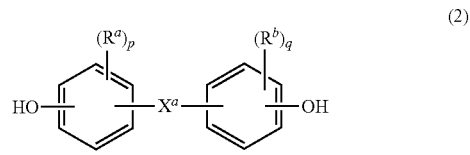

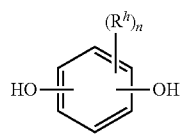

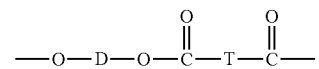

wherein in formula (2) $R^a$ and $R^b$ are each independently $C_{1-12}$ alkyl, $C_{2-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and in formula (3), each $R^h$ is independently a $C_{1-10}$ hydrocarbyl group such as a $C_{1-10}$ alkyl, a $C_{6-10}$ aryl, and n is 0 to 4.

In an aspect in formulas (2) and (3), $R^a$ and $R^b$ are each independently $C_{1-3}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently a $C_{1-3}$ alkyl, and n is 0 to 1.

Some illustrative examples of dihydroxy compounds (2) that can be used are described, for example, in WO 2013/175448 A1, US 2014/0295363, and WO 2014/072923. Specific dihydroxy compounds include 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxyphenyl)-3,3,5-trimethylcyclohexane (isophorone bisphenol). Examples of diphenol compounds (3) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, or the like. A combination of different diphenol compounds can be used.

Preferably, the aromatic carbonate units are bisphenol A carbonate units having the formula (2a):

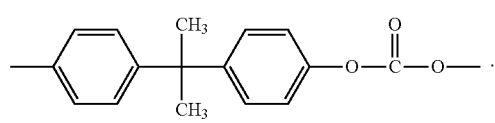

The poly(carbonate-siloxane-arylate) further comprises aromatic ester (arylate) units, i.e., ester units based on an aromatic dicarboxylic acid repeating ester units of formula (4)

wherein D is a divalent group derived from a dihydroxy compound, and can be, for example, a $C_{6-20}$ alicyclic group or a $C_{6-20}$ aromatic group; and T is a divalent $C_{6-20}$ arylene group. In an aspect, D is derived from a dihydroxy aromatic compound of formula (2), formula (3) or a combination thereof. The D and T groups are desirably minimally substituted with hydrocarbon-containing substituents such as alkyl, alkoxy, or alkylene substituents. In an aspect, less than 5 mol %, preferably less than or equal to 2 mol %, and still more preferably less than or equal to 1 mol % of the combined number of moles of D and T groups are substituted with hydrocarbon-containing substituents such as alkyl, alkoxy, or alkylene substituents.

Examples of aromatic dicarboxylic acids from which the T group in the ester unit of formula (4) is derived include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 99:1 to 1:99.

In an aspect, the aromatic ester units are derived from the reaction product of one equivalent of an isophthalic acid derivative and/or terephthalic acid derivative. In such a circumstance, the aromatic ester units are of formula (4a) or (4b):

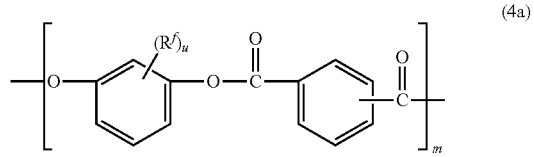

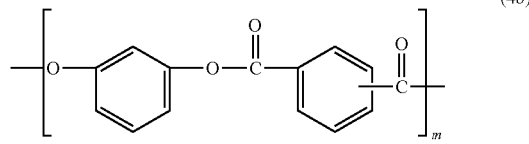

wherein each $R^f$ is independently a $C_{1-10}$ hydrocarbyl group such as a $C_{1-10}$ alkyl, a $C_{6-10}$ aryl, u is 0 to 4, preferably 0, and m is greater than or equal to 4. In an aspect, m is 4 to 100, 4 to 50, preferably 5 to 30, more preferably 5 to 25, and still more preferably 10 to 20. The molar ratio of isophthalate to terephthalate can also be 0.25:1 to 4.0:1. Preferred aromatic ester units are isophthalate-terephthalate-resorcinol ester units, isophthalate-terephthalate-bisphenol A ester units, or a combination of these, which can be referred to respectively as poly(isophthalate-terephthalate-resorcinol) ester units, poly(isophthalate-terephthalate-bisphenol-A) ester units, and poly[(isophthalate-terephthalate-resorcinol) ester-co-(isophthalate-terephthalate-bisphenol-A)] ester units.

In an aspect, the aromatic carbonate units and the aromatic ester units are present as blocks of formula (5):

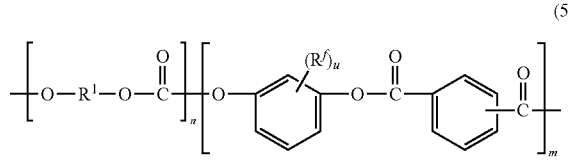

wherein $R^f$, u, and m are as defined in formula (4a), each $R^1$ is independently a $C_{6-30}$ arylene group, and n is greater than or equal to one, for example 3 to 50, preferably from 5 to 25, and more preferably from 5 to 20. In an aspect, m is 5 to 75 and n is 3 to 50, or m is 10 to 25 and n is 5 to 20, and the molar ratio of isophthalate units to terephthalate units is 80:20 to 20:80. In the foregoing embodiment, the preferred carbonate units are bisphenol A carbonate units, optionally together with resorcinol carbonate units, and the aromatic ester units are poly(isophthalate-terephthalate-resorcinol) ester units, poly(isophthalate-terephthalate-bisphenol-A) ester units, and poly[(isophthalate-terephthalate-resorcinol) ester-co-(isophthalate-terephthalate-bisphenol-A)] ester units. In a specific embodiment, the carbonate and aromatic ester units are present as a poly(isophthalate-terephthalate-resorcinol ester)-co-(resorcinol carbonate)-co-(bisphenol-A carbonate) segment.

The carbonate and aromatic ester units desirably comprise a minimum amount of saturated hydrocarbon present in the form of substituents or structural groups such as bridging groups or other connective groups. In an aspect, less than or equal to 25 mol %, preferably less than or equal to 15 mol %, and still more preferably less than or equal to 10 mol % of the combined aromatic ester units and carbonate units comprise alkyl, alkoxy, or alkylene groups. In another embodiment, the aromatic ester units and the carbonate units are not substituted with non-aromatic hydrocarbon-containing substituents such as alkyl, alkoxy, or alkylene substituents.

The siloxane units (also referred to as polysiloxane blocks) are of formula (6):

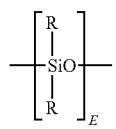

wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. Combinations of the foregoing R groups can be used in the same copolymer.

In an aspect, R is a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In still another aspect, R is methyl, or phenyl.

The value of E in formula (6) can vary widely depending on the type and relative amount of each component in the thermoplastic compositions, the desired properties of the composition, and like considerations. Generally, E has an average value of 2 to 125, 5 to 80, or 10 to 100. Preferably, E has an average value of 5 to 20 or 5 to 15, and E can also have an average value of 20 to 80, or 30 to 70, preferably 30 to 50 or 40 to 50. As used herein, the average value of E means number average value of E.

In an aspect, the siloxane units are of formula (7):

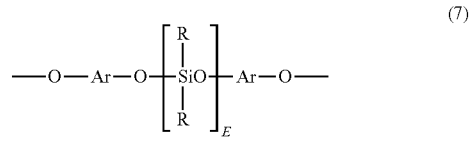

wherein E is as defined in formula (6); each R can be the same or different and is as defined above in the context of formula (6); and Ar can be the same or different and is a substituted or unsubstituted $C_{6-30}$ arylene, wherein the bonds are directly connected to an aromatic moiety. Ar groups in formula (7) can be derived from a $C_{6-30}$ dihydroxyarylene compound, for example a dihydroxy compound of formula (2). Exemplary dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used.

Specific examples of siloxane units of formula (7) include those of the formulas (7a) and (7b):

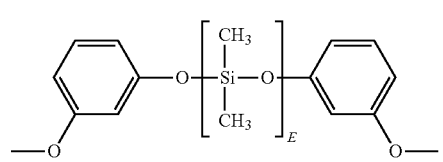

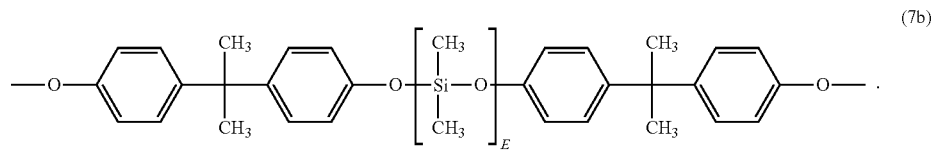

In another aspect, the siloxane units are of formula (8):

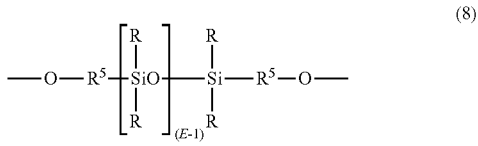

(8)

wherein R and E are as described in formula (6), and each $R^5$ is independently a divalent $C_1$-$C_{30}$ organic group, and wherein the polymerized polysiloxane unit is the reaction residue of its corresponding dihydroxy compound. Preferably, the siloxane units are of formula (9):

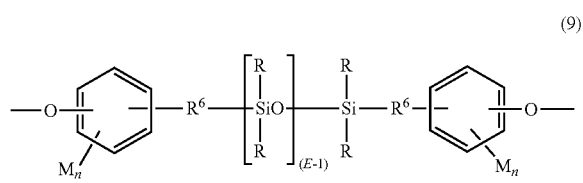

(9)

wherein R and E are as defined above in the context of formula (6). $R^6$ in formula (9) is a divalent $C_{2-8}$ aliphatic. Each M in formula (9) can be the same or different, and can be cyano, nitro, a $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ arylalkylenoxy, $C_{7-12}$ alkylarylene, or $C_{7-12}$ alkylarylenoxy, wherein each n is independently 0, 1, 2, 3, or 4.

In an aspect, M is an alkyl such as methyl, ethyl, or propyl, an alkoxy such as methoxy, ethoxy, or propoxy, or an aryl such as phenyl, or tolyl; $R^6$ is a dimethylene, trimethylene or tetramethylene; and R is a $C_{1-8}$ alkyl, cyanoalkyl, or aryl such as phenyl, or tolyl. In another embodiment, R is methyl, or a combination of methyl and phenyl. In still another embodiment, R is methyl, M is methoxy, n is one, and $R^6$ is a divalent $C_{1-3}$ aliphatic group. Specific siloxane units are of the formula

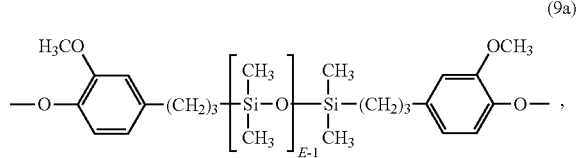

(9a)

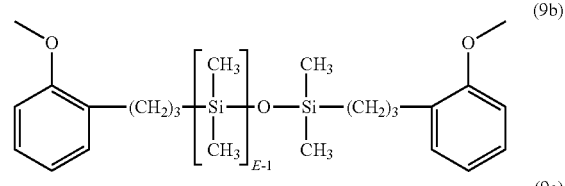

(9b)

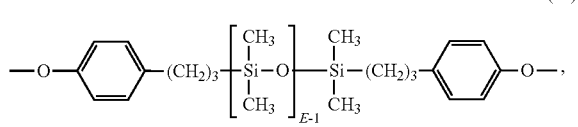

(9c)

or a combination thereof, wherein E has an average value of 5 to 20 or 5 to 15.

Blocks of formula (9) can be derived from the corresponding dihydroxy polydiorganosiloxane, which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. The polysiloxane units can then be endcapped, with resorcinol or bisphenol A, for example, by the synthetic procedures of European Patent Application Publication No. 0 524 731 A1 of Hoover. The endcapped polysiloxane can the form an ester-linked structure with a carboxylic acid derivative during formation of the poly(carbonate-siloxane-arylate), or a carbonate-linked structure by copolymerization with a carbonate precursor such as chloroformate, or a combination of such structures.

The poly(carbonate-siloxane-arylate) can be manufactured by different methods such as solution polymerization, interfacial polymerization, and melt polymerization as is known in the art. Generally, the poly(carbonate-siloxane-arylate) is provided by the reaction of a diacid derivative, a difunctional polysiloxane, a dihydroxy aromatic compound, and, a carbonyl source, in a biphasic medium comprising an immiscible organic phase and aqueous phase. In an embodiment, the arylate unit is formed by reacting a dihydroxy aromatic compound and a dicarboxylic acid dichloride in a biphasic medium in the presence of a base. The order and timing of addition of these components to the polymerization reaction can be varied to provide a poly(carbonate-siloxane-arylate) having different distributions of the polysiloxane in the polymer backbone. All types of end groups are contemplated as being useful, e.g., phenol, cyanophenol, or para-cumyl phenol, provided that such end groups do not significantly affect desired properties of the polycarbonate copolymer compositions.

The poly(carbonate-siloxane-arylate) comprises 0.2 to 49.8 mol %, 1 to 40 mol %, or 1 to 20 mol % of carbonate units such as bisphenol-A carbonate units, 50 to 99.6 mol % or 50 to 95 mol % of aromatic ester units (4a) or (4b), and an amount of polysiloxane units (7a), (7b), (9a), (9b), (9c), or a combination comprising at least one of the foregoing, specifically (9a), in an amount effective to provide 0.2 to 10 wt %, preferably 0.2 to 6 wt %, more preferably 0.2 to 5 wt %, and still more preferably 0.25 to 2 wt % siloxane units, each based on the total copolymer. For example, the poly(carbonate-siloxane-arylate) can comprise 1 to 20 mol % of bisphenol-A carbonate units, 60 to 90 mole % of aromatic ester units (4b), and an amount of polysiloxane units (9a), (9b), (9c) or a combination comprising at least one of the foregoing (specifically of formula 9a) effective to provide 0.2 to 5 wt % of siloxane units, each based on the total copolymer.

In an aspect, the thermoplastic compositions contain 40 to 75 wt % or 60 to 65 wt % of the poly(carbonate-siloxane-arylate), based on the total weight of the thermoplastic compositions.

In addition to poly(carbonate-siloxane-arylate), the thermoplastic compositions further comprise a poly(carbonate-siloxane). The poly(carbonate-siloxane) can comprise carbonate units and siloxane units as described herein in the context of poly(carbonate-siloxane-arylate). Unlike poly(carbonate-siloxane-arylate), the poly(carbonate-siloxane) can be free of aromatic ester units. In an aspect, the poly(carbonate-siloxane) comprises carbonate units derived from bisphenol A, and repeating siloxane units (7a), (7b), (9a), (9b), (9c), or a combination thereof (preferably of formula 9a), wherein E has an average value of 10 to 100, preferably 20 to 80, or 30 to 70, more preferably 30 to 50 or 40 to 50.

The poly(carbonate-siloxane) can have a siloxane content of 5 to 45 wt %, 5 to 30 wt %, or 10 to 30 wt %, preferably 15 to 25 wt %, more preferably 17 to 23 wt %, each based on the total weight of the poly(carbonate-siloxane). As used herein, "siloxane content" of a poly(carbonate-siloxane) refers to the content of siloxane units based on the total weight of the poly(carbonate-siloxane). The poly(carbonate-siloxane) can have an Mw of 28,000 to 32,000 Dalton (Da), preferably 29,000 to 31,000 Da as measured by gel permeation chromatography using a crosslinked styrene-divinyl benzene column, at a sample concentration of 1 milligram per milliliter, and as calibrated with bisphenol A polycarbonate standards.

The poly(carbonate-siloxane) can be present in an amount effective to provide 0.75 to 7 wt %, preferably 1 to 5 wt % or 1 to 4 wt %, and more preferably 1 to 3 wt % siloxane units, based on the total weight of the thermoplastic compositions. In an aspect, the poly(carbonate-siloxane) is present in the thermoplastic compositions in an amount of 5 to 45 wt %, preferably 5 to 25 wt %, and more preferably 5 to 15 wt %, based on the total weight of the thermoplastic compositions.

The linear and the branched polycarbonate homopolymers can comprise carbonate units as described herein in formula (1) or are derived from bisphenols of formula (2) or (3). Preferably the linear and the branched polycarbonate homopolymers have bisphenol A carbonate units of formula (2a).

The linear polycarbonate homopolymer can have a weight average molecular weight of 15,000 to 20,000 Da or 16,000 to 19,000 Da as measured by gel permeation chromatography (GPC), using a crosslinked styrene-divinylbenzene column and calibrated to bisphenol A homopolycarbonate references. The linear polycarbonate homopolymer can have endgroups derived from an end-capping agent such as phenol, p-cumylphenol, or a combination comprising at least one of the foregoing.

To create the branched polycarbonate, a particular type of branching agent is used. These branched polycarbonate materials have statistically more than two end groups. The branching agent is added in an amount (relative to the bisphenol monomer) that is sufficient to achieve the desired branching content, that is, more than two end groups. The molecular weight of the polymer may become very high upon addition of the branching agent, and to avoid excess viscosity during polymerization, an increased amount of a chain stopper agent can be used, relative to the amount used when the particular branching agent is not present. The amount of chain stopper used is generally above 5 mole percent and less than 20 mole percent compared to the bisphenol monomer.

Such branching agents include aromatic triacyl halides, for example triacyl chlorides of formula (10)

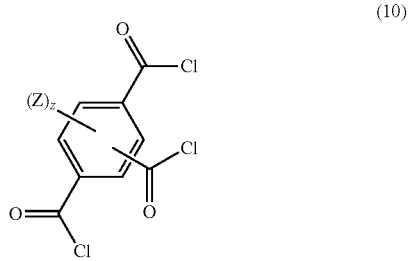

wherein Z is a halogen, $C_{1-3}$ alkyl, $C_{1-3}$ alkoxy, $C_{7-12}$ arylalkylene, $C_{7-12}$ alkylarylene, or nitro, and z is 0 to 3; a tri-substituted phenol of formula (11)

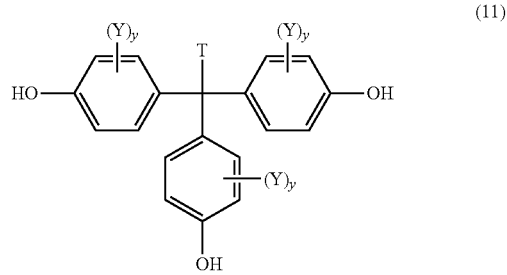

wherein T is a $C_{1-20}$ alkyl, $C_{1-20}$ alkoxy, $C_{7-12}$ arylalkyl, or $C_{7-12}$ alkylaryl, Y is a halogen, $C_{1-3}$ alkyl, $C_{1-3}$ alkoxy, $C_{7-12}$ arylalkyl, $C_{7-12}$ alkylaryl, or nitro, s is 0 to 4; or a compound of formula (12) (isatin-bis-phenol)

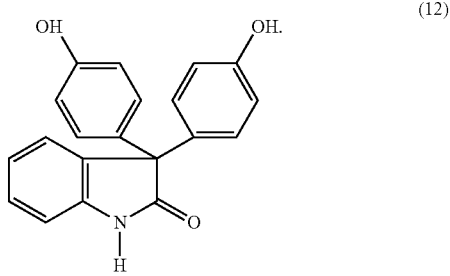 [SMILES: O=C1Nc2ccccc2C1(c1ccc(O)cc1)c1ccc(O)cc1]

Examples of specific branching agents that are particularly effective in the compositions include trimellitic trichloride (TMTC), tris-p-hydroxyphenylethane (THPE), and isatin-bis-phenol.

The amount of the branching agents used in the manufacture of the polycarbonate will depend on a number of considerations, for example the type of $R^1$ groups in the carbonate units (1), the amount of chain stopper, e.g., cyanophenol, and the desired molecular weight of the polycarbonate. In general, the amount of branching agent is effective to provide 0.1 to 10 branching units per 100 unbranched carbonate units (1) ($R^1$ units), specifically 0.5 to 8 branching units per 100 $R^1$ units, and more specifically 0.75 to 5 branching units per 100 $R^1$ units. A combination of two or more branching agents can be used. The branching agents can be added at a level of 0.05 to 2.0 wt %.

In an aspect, the branched polycarbonate comprises units (1) or (2a) as described above; greater than or equal to 3 mole %, e.g., 3 to 10 mole %, based on the total moles of the polycarbonate, of moieties derived from a branching agent; and end-capping groups derived from an end-capping agent having a pKa between 8.3 and 11. The branching agent can comprise trimellitic trichloride, 1,1,1-tris(4-hydroxyphenyl) ethane (THPE) or a combination of trimellitic trichloride and 1,1,1-tris(4-hydroxyphenyl)ethane, and the end-capping agent is phenol or a phenol containing a substituent of cyano group, aliphatic groups, olefinic groups, aromatic groups, ester groups, ether groups, or a combination comprising at least one of the foregoing. In a specific embodiment, the end-capping agent is phenol, p-t-butylphenol, p-methoxyphenol, p-cyanophenol, p-cumylphenol, or a combination comprising at least one of the foregoing. Preferably, the branched polycarbonate comprises bisphenol A carbonate units, 3 to 10 mol %, based on the total moles of the branched polycarbonate, of a moiety derived from 1,1,1-tris (4-hydroxyphenyl)ethane, and end-capping groups derived from p-cyanophenol.

The branched polycarbonate has a molecular weight of between 28,000 and 40,000 Da or 30,000 to 35,000 Da as measured by gel permeation chromatography (GPC), using a crosslinked styrene-divinylbenzene column and calibrated to bisphenol A homopolycarbonate references.

The thermoplastic compositions can contain 10 to 40 wt %, 10 to 30 wt %, or 15 to 25 wt % of the linear or the branched polycarbonate homopolymer or a combination thereof.

The organophosphorus flame retardant in the thermoplastic compositions has a structure represented by formula (13):

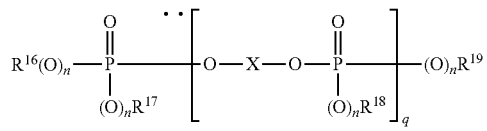
(13)

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl, and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}$, $R^{18}$, and $R^{19}$ are each independently $C_{1-4}$ alkyl, naphthyl, phenyl($C_{1-4}$ alkylene), or aryl groups optionally substituted by $C_{1-4}$ alkyl. Specific aryl moieties are cresyl, phenyl, xylenyl, propylphenyl, or butylphenyl. In some embodiments X in formula (13) is a mono- or poly-nuclear aromatic $C_{6-30}$ moiety derived from a diphenol. Further in formula (13), n is each independently 0 or 1; in some embodiments n is equal to 1. Also in formula (13), q is from 0.5 to 30, from 0.8 to 15, from 1 to 5, or from 1 to 2. Specifically, X can be represented by the following divalent groups (14) or a combination thereof,

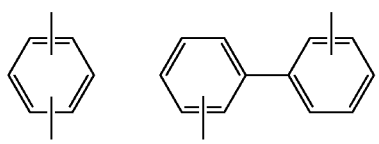
(14)

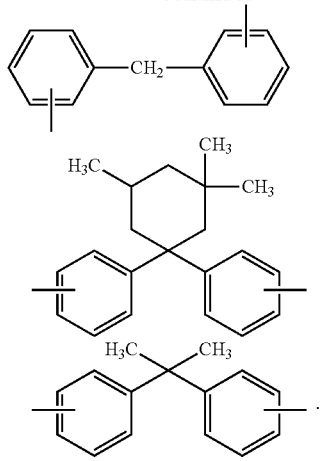

Preferably in formula (13), each of $R^{16}$, $R^{17}$, $R^{18}$, and $R^{19}$ can be aromatic, i.e., phenyl, n is 1, and q is 1-5, specifically 1-2, and X is of formula (14).

Specific aromatic organophosphorus compounds are represented by formula (14a).

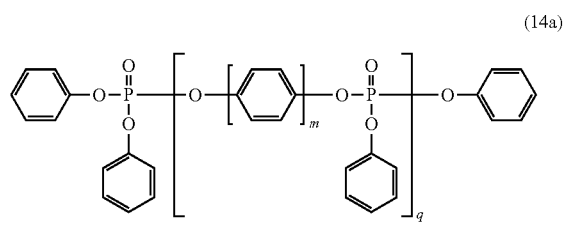
(14a)

wherein m is 1 or 2, and q is as described in formula (13).

Commercially available flame retardants include an oligomeric phosphate ester having a phosphorus content of 10.7 wt %, a specific gravity of 1.3, and a melting point of 101-108° C., available as Sol-DP from FYROLFLEX and a phosphate ester of formula (14b)

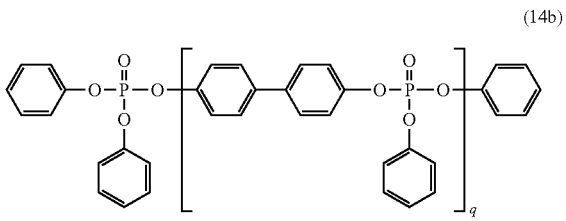
(14b)

having a phosphorus content 9.5 wt %, available as FP 800 from CEL-SPAN.

The organophosphorus compound is present in an amount effective to provide 0.1 to 1 wt % of phosphorus, based on the total weight of the thermoplastic compositions. Accordingly, depending on the particular organophosphorus compound used, the thermoplastic compositions can comprise from 2 to 15 wt %, or 2 to 10 wt %, or 5 to 8 wt %, or 6 to 8 wt % of the organophosphorus flame retardant, each based on the total weight of the compositions.

The thermoplastic compositions can be essentially halogen-free. "Essentially halogen-free" is defined as having a chlorine or bromine content of less than or equal to 100 parts per million by weight (ppm), less than or equal to 75 ppm, or less than or equal to 50 ppm, based on the total parts by weight of the composition, excluding any filler or colorants. "Essentially halogen-free" also means that the total amount of chlorine and bromine is less than or equal to 200 ppm, less than or equal to 150 ppm, or less than or equal to 100 ppm, based on the total parts by weight of the composition, excluding any filler.

Optionally, the thermoplastic compositions further contain a mineral filler, glass, carbon, or a combination comprising at least one of the foregoing. Examples of mineral fillers include aluminum silicate, calcium carbonate, calcium sulfate dihydrate, calcium sulfate hemihydrate, calcinated clay, calcium silicate, clay, crushed quartz, diatomaceous earth, fly ash, kaolin, limestone, mica, silicates, talc, titanium dioxide, wollastonite, zirconium oxide, and zirconium silicate. The mineral filler, glass, carbon, or a combination comprising at least one of the foregoing can be present in an amount of 5 to 45 wt % based on the total weight of the thermoplastic compositions.

The thermoplastic compositions can further include various additives ordinarily incorporated into flame retardant compositions having low smoke density and low heat release, with the proviso that the additive(s) are selected so as to not adversely affect the desired properties of the thermoplastic composition significantly, in particular low smoke density and low heat release. Such additives can be mixed at a suitable time during the mixing of the components for forming the composition. Exemplary additives include antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, additional flame retardants, and anti-drip agents. A combination of additives can be used. In general, the additives are used in the amounts generally known to be effective. The total amount of additives (other than any filler or reinforcing agents) can be 0.01 to 5 wt % based on the total weight of the thermoplastic compositions. Preferably, the thermoplastic compositions comprise no more than 5 wt % based on the weight of the compositions of a processing aid, a heat stabilizer, anti-drip agent, an antioxidant, a colorant, or a combination comprising at least one of the foregoing.

The thermoplastic compositions can have a combination of desired properties. As discussed herein, the thermoplastic compositions are formulated to meet strict flammability requirements. The thermoplastic composition can have an OSU integrated 2-minute heat release test value of less than 65 kW-min/m$^2$ and a peak heat release rate of less than 65 kW/m$^2$ as measured using the method of FAR F25.4, in accordance with Federal Aviation Regulation FAR 25.853 (d), on parts with a thickness of 1.5, 2, or 3 mm.

The thermoplastic composition can further have a flame time of less than 15 seconds, a burn length of less than 6 inches, and a drip extinguishing time of less than 5 seconds, each measured using the method of FAR F25.5, in accordance FAR 25.853(a) at a thickness of 1.5, 2, or 3 mm.

The thermoplastic compositions can further have excellent impact properties, including impact resistance, or ductility, or both. The compositions can have a notched Izod impact resistance of greater than 30 kJ/m$^2$ determined in accordance with ISO 180:2000 on 4 mm ISO bars at 23° C., with a 5.5 J hammer. The compositions can also have a notched Izod impact resistance of greater than 700 J/m$^2$ and a ductility of greater than 80% or 100%, each measured on notched 3.2 mm bars at 23° C., in accordance with the ASTM-D256-10 (2018) standard. The compositions can have a ductility in multiaxial impact of 100%, performed on notched discs having a thickness of 3.2 mm and a diameter of 100 mm at 23° C., in accordance with the ISO-6603-2: 2000 standard at an impact speed of 4.4 m/s. The same or similar values can be obtained in articles having a wide range of thicknesses, for example from 0.1 to 10 mm, but particularly at 0.5 to 5 mm. The compositions can also have a ductility in multiaxial impact of 100% at lower temperatures, such as +10° C., 0° C., −10° C., −20° C., or −30° C.

The compositions can further have good melt viscosities, which aids processing. The thermoplastic composition can have a melt volume flow rate (MVFR) of greater than 6 cc/10 min (cubic centimeter per 10 minutes), or 6 to 20 cc/10 min, when measured in accordance with the ISO-1133-1: 2011 standard at 300° C. under a load of 1.2 kg with a residence time of 300 seconds.

Melt viscosity (MV) is a measurement of the rheological characteristics of a composition at temperatures and shear conditions common to processing equipment. A lower value for melt viscosity indicates that the composition flows more easily. The thermoplastic compositions as disclosed herein can have a melt viscosity of 200 to 350 Pascal-second (Pa-s), measured in accordance with ISO 11443:2014 at a temperature of 280° C. under a shear rate of 1500 per second (s$^{-1}$). The thermoplastic compositions can also have a melt viscosity of 150 to 300 Pa-s, measured in accordance with ASTM D3835-16 at a temperature of 300° C. under a shear rate of 1500 s$^{-1}$.

Methods for forming the thermoplastic compositions can vary. In an embodiment, the polymers are combined with any additives (e.g., a mold release agent) such as in a screw-type extruder. The polymers any additives can be combined in any order, and in form, for example, powder, granular, filamentous, as a masterbatch, and the like. Transparent compositions can be produced by manipulation of the process used to manufacture the thermoplastic composition. One example of such a process to produce transparent thermoplastic compositions is described in U.S. Pat. No. 7,767,738, incorporated herein by reference in its entirety. The thermoplastic compositions can be foamed, extruded into a sheet, or optionally pelletized. Methods of foaming a thermoplastic composition using frothing or physical or chemical blowing agents are known and can be used. The pellets can be used for molding into articles, foaming, or they can be used in forming a sheet of the flame-retardant thermoplastic composition. In some embodiments, the composition can be extruded (or co-extruded with a coating or other layer) in the form of a sheet and/or can be processed through calendaring rolls to form the desired sheet.

The thermoplastic compositions can also be used to make powders, filaments, or composites. In addition to the thermoplastic composition, the composites can also include a fibrous material such as glass, carbon, basalt in a format such as woven fibers, non-woven fibers, or uni-directional long fiber tapes. The weight ratio of the thermoplastic composition relative to the fibrous material can be 10:1 to 1:1.

Shaped, formed, or molded articles comprising the thermoplastic compositions are also provided. The thermoplastic compositions can be molded into useful shaped articles by a variety of means such as injection molding, extrusion, rotational molding, blow molding, and thermoforming to form articles. Thus, the thermoplastic compositions can be used to form a foamed article, a molded article, a thermoformed article, an extruded film, an extruded sheet, a layer of a multi-layer article, e.g., a cap-layer, a substrate for a coated article, or a substrate for a metallized article. These values can be obtained in articles having a wide range of thicknesses, for example from 0.1 to 10 mm, or 0.5 to 5 mm. The articles can also be additively formed using a powder or filament comprising the thermoplastic compositions disclosed herein.

The thermoplastic compositions are particularly useful in aircraft, for example a variety of aircraft compartment interior applications. Accordingly, the articles can be interior components for aircraft, including access panels, access doors, air flow regulators baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, ceiling paneling, flaps, boxes, hoods, louvers, insulation material and the body shell in interiors, side walls, front walls/end walls, partitions, room dividers, interior doors, interior lining of the front-/end-wall doors and external doors, luggage overhead luggage racks, vertical luggage rack, luggage container, luggage compartments, windows, window frames, kitchen interiors, surfaces or a component assembly comprising at least one of the foregoing, and the like. The thermoplastic compositions can be formed (e.g., molded) into sheets that can be used for any of the above-mentioned components. It is generally noted that the overall size, shape, thickness, optical properties, and the like of the thermoplastic sheet can vary depending upon the desired application.

The thermoplastic compositions having balanced flow, impact resistance, and OSU heat release are further illustrated by the following non-limiting examples.

EXAMPLES

The materials used in the Examples are described in Table 1. Amounts of components are in wt %, unless otherwise indicated.

TABLE 1

| Component | Trade name; chemical description | Source |
|---|---|---|
| PC-1 | Branched bisphenol A homopolycarbonate, 1,1,1-tris(4-hydroxyphenyl)ethane (THPE) branching agent, produced via interfacial polymerization, having a weight average Mw of about 33,600 g/mol as determined by GPC using bisphenol A polycarbonate standards | SABIC |
| PC-2 | Linear bisphenol A homopolycarbonate, Mw = 18,000-21,000 g/mol as determined by GPC using bisphenol A polycarbonate standards | SABIC |
| PC-Si-ITR | Poly(bisphenol A carbonate-dimethylsiloxane-resorcinol iso/terephthalate ester)], 83 mol % ester content (isophthalate:terephthalate mole ratio = 1:1), 1 wt % dimethylsiloxane content (average siloxane chain length = 8-12), prepared by interfacial polymerization, Mw = 22,500 to 26,500 g/mol as determined by GPC using bisphenol A polycarbonate standards, para-cumyl phenol end-capped | SABIC |
| PC-Si | Poly(bisphenol A carbonate-dimethylsiloxane) prepared via interfacial polymerization, 20 wt % dimethylsiloxane content (average siloxane chain length = 44-46), Mw = 29,000-31,000 g/mol as determined by GPC using bisphenol A polycarbonate standards, para-cumylphenol (PCP) end-capped, PDI = 2-3 | SABIC |
| $TiO_2$ | Titanium dioxide, available as KRONOS 2233 | KRONOS Worldwide, Inc. |

TABLE 1-continued

| Component | Trade name; chemical description | Source |
|---|---|---|
| FR-1 | Oligomeric phosphate ester having a phosphorus content of 10.7 wt %, a specific gravity of 1.3, and a melting point of 101-108° C., available as Sol-DP | FYROLFLEX |
| FR-2 | Phosphate ester of formula (14b) having a phosphorus content of 9.5 wt %, available as FP 800 | CEL-SPAN |
| PEPQ | Tetrakis(2,4-di-tert-butylphenyl)[1,1-biphenyl]-4,4'diylbisphosphonite | Clariant |
| CB | Carbon black, available as MONARCH 800 | Cabot Corp. |
| SV 36 | Solvent violet 36, available as MACROLEX VIOLET 3R | LANXESS |
| SB 104 | Solvent blue 104, available as SANDOPLAST BLUE 2B | Clariant |
| PB 15:4 | Pigment blue 15:4, available as SUNFAST BLUE 248-3450 | Sun Chemical |
| SR 135 MB | Solvent red 135 MB, 1% in polycarbonate, available as MACROLEX RED EG | LANXESS |
| PB 28 MB | Pigment blue 28 MB, 1% in polycarbonate, SICOPAL BLUE K6310 | BASF |

Combining, Extrusion, and Molding Conditions

All powder additives were combined together with the polycarbonate powder(s), using a paint shaker, and fed through one feeder to an extruder. Extrusion for all combinations was performed on a 25 mm twin screw extruder, using a melt temperature of 260 to 290° C. and 300 revolutions per minute (Tpm), then pelleted. The pellets were dried for 3-5 hours at 90-100° C. Dried pellets were injection molded at temperatures of 260 to 290° C. to form specimens for most of the tests below.

Testing Methods

Heat distortion temperatures (HDT) were determined in accordance with the ISO-75-2:2013 standard with a 5.5 J hammer, using the flat side of 10 mm×4 mm thick ISO bars and a load of 1.8 MPa (A/f).

ISO notched Izod impact measurements (Notched Izod ISO) were performed on notched 10 mm×4 mm thick ISO bars at 23° C., in accordance with the ISO-180:2000 standard with a 5.5 J hammer. Ductility is expressed as a percentage of the bars showing ductile failure.

Multi-axial impact (MAI) measurements were performed on notched discs having a thickness of 3.2 mm and a diameter of 100 mm at 23° C., in accordance with the ISO-6603-2:2000 standard at an impact speed of 4.4 m/s. Ductility is expressed as a percentage of the discs showing ductile failure.

ASTM notched Izod impact measurements (Notched Izod ASTM) were performed on notched 3.2 mm-thick bars at 0 or 23° C., in accordance with the ASTM-D256-10 (2018) standard. Ductility is expressed as a percentage of the bars showing ductile failure.

Melt volume flow rate (MVFR) was measured in accordance with the ISO-1133-1:2011 standard at 300° C. under a load of 1.2 kg with a residence time of 300 seconds. The granules were dried for 3 hours at 90° C. before measurement.

Melt viscosity (MV) was measured in accordance with ISO 11443:2014 at the indicated temperature and shear rate.

Vicat softening temperatures (Vicat) were measured on 4 mm ISO bars in accordance with the ISO-306:2013 standard at a load of 10 N and a speed of 50°/hr (A50) or a load of 50 N and a speed of 120° C./hr (B120), respectively.

The spiral flow (SF) length was measured under a melt temperature of 330° C., a mold temperature of 100° C., and an injection pressure of 1000, 1600, or 2200 bar. The resulting molded parts had a thickness of 3 mm or 1.5 mm.

All samples submitted for FAR testing were injection molded parts which have been pre-conditioned for 24 hours in a humidity chamber with 50% relative humidity at 23° C., as dictated by the FAA (Federal Aviation Administration) protocol. The average of three individual samples must be in accordance to the passing criteria for each FAR test.

OSU (Ohio State University) two minute and peak heat release were measured on 15.2×15.2 cm×3 mm test parts in accordance with FAR 25.853(a), Appendix F, part IV. The samples were placed vertically in a calorimeter, exposed to a radiant panel and pilot flames. Results are shown as a pass if the two-minute total integrated heat release value is below or equal to 65 kW-min/m$^2$ (kilowatt minute per square meter) and the peak heat release is below or equal to 65 kW/m$^2$ (kilowatt per square meter) in the 5 minute duration of the test.

Vertical burn test was performed according to FAR 25.853 (a), Appendix F, Part I, (a),1,(i), on a plaque of 76×305 mm with a thickness of 3 mm using a vertical Bunsen burner. Test sample was placed beneath the burner for 60 seconds, after which the burner was removed and the flame time (time in seconds that the specimen continues to flame after burner flame is removed), the average drip extinguishing time (time in seconds that any flaming material continues to flame after falling from specimen) and the average burn length (distance from original specimen's edge to farthest evidence of damage to the specimen in mm) were measured. If the flame time is less than or equal to 15 seconds, burn length is less than or equal to 6 inch, and drip extinguishing time is less than or equal to 3 seconds, then the material passes the vertical burn test.

Smoke density was performed according to FAR 25.853 (d), Appendix F, Part V on plaques of 76×76 mm with a thickness of 2 mm each. The test part was placed vertically in a smoke density NBS chamber and exposed to a radiant furnace and pilot flames. The following parameters were measured: Optical smoke density (DS) in 1.5 minutes, DS in 4 minutes and the maximum smoke density (DS-4) that occurs in the first 4 minutes of the test. In order to pass the smoke density test, the three samples must show an average of less than or equal to 200.

Examples 1-6

Exemplary compositions (Ex5 and Ex6) and comparative compositions (CEx1 to CEx4) were tested for impact, flow, heat, and OSU heat release performance. The formulations and the results are shown in Table 2.

TABLE 2

| Component | Unit | CEx1 | CEx2 | CEx3 | CEx4 | Ex5 | Ex6 |
|---|---|---|---|---|---|---|---|
| PC-Si-ITR | Wt % | 93.44 | 73.44 | 63.44 | 53.44 | 53.44 | 63.44 |
| PEPQ | Wt % | 0.06 | 0.06 | 0.06 | 0.06 | 0.06 | 0.06 |
| FR-1 | Wt % | 6.5 | 6.5 | 6.5 | 6.5 | 6.5 | 6.5 |
| PC-Si | Wt % | | | | | 10 | 10 |
| PC-1 (branched) | Wt % | | 20 | 30 | 40 | 30 | 20 |
| Property | | | | | | | |
| Notched Izod ISO, 23° C. | kJ/m$^2$ | 9 | 9 | 9 | 9 | 72 | 58 |
| Notched Izod ASTM, 23° C. | J/m | 95 | 90 | 85 | 89 | 1030 | 1010 |
| MVFR at 300° C. | cm$^3$/10 min | 10.8 | 9.3 | 8.3 | 7.7 | 7.2 | 8.3 |
| MV at 280° C., 1500 1/s | Pa-s | 389 | 395 | 384 | 372 | 341 | 333 |
| MV at 300° C., 1500 1/s | Pa-s | 249 | 260 | 264 | 266 | 234 | 230 |
| Vicat—B/120 | ° C. | 112 | 115 | 116 | 113 | 115 | 114 |
| HDT—1.8 MPa | ° C. | 95 | 99 | 101 | 97 | 100 | 97 |
| SF—1000 bar—1.5 mm | cm | 9.0 | — | 9.0 | — | 9.1 | — |
| SF—1600 bar—1.5 mm | cm | 12.6 | — | 12.1 | — | 13.0 | — |
| SF—2200 bar—1.5 mm | cm | 16.4 | — | 16.0 | — | 16.9 | — |
| SF—1000 bar—3 mm | cm | 15.4 | — | 16.3 | — | 17.1 | — |
| SF—1600 bar—3 mm | cm | 25.1 | — | 26.0 | — | 26.9 | — |
| SF—2200 bar—3 mm | cm | 37.4 | — | 38.1 | — | 38.8 | — |
| OSU HR 2 min peak HR | | Pass | Pass | | Pass | | |

The hyphens indicate not measured or not measurable.

The data in Table 2 shows that the addition of up to 40 wt % of a branched polycarbonate (PC-1) to a PC-Si-JTR and flame retardant (FR-1) combination provides OSU 65/65 compliant compositions (CEx2, CEx3, and CEx4). However, the impact resistance is very low. As shown in Ex5-6, replacing 10 wt % of the PC-1 in CEx3 and CEx4 with a bisphenol A polycarbonate-dimethylsiloxane copolymer (PC-Si) greatly enhances the impact resistance. Although the MVFR of Ex5 to Ex6 decreases relative to CEx1 to CEx4, the thinning effect under shear, as seen by comparing the melt viscosity and spiral flow, indicate that the compositions of Ex5 and Ex6 are still suitable for use in injection molding applications.

Examples 7-13

Exemplary compositions (Ex11 to Ex13) and comparative compositions (CEx7 to CEx10), were tested for impact resistance, flow, and heat properties. The formulations and the results are shown in Table 3.

TABLE 3

| Component | Unit | CEx7 | CEx8 | CEx9 | CEx10 | Ex11 | Ex12 | Ex13 |
|---|---|---|---|---|---|---|---|---|
| PC-Si-ITR | Wt % | 92.44 | 72.44 | 62.44 | 52.44 | 82.44 | 62.44 | 52.44 |
| PEPQ | Wt % | 0.06 | 0.06 | 0.06 | 0.06 | 0.06 | 0.06 | 0.06 |
| FR-2 | Wt % | 7.5 | 7.5 | 7.5 | 7.5 | 7.5 | 7.5 | 7.5 |
| PC-Si | Wt % | | | | | 10 | 10 | 10 |
| PC-1 (branched) | Wt % | | 20 | 30 | 40 | | 20 | 30 |
| Property | | | | | | | | |
| Notched Izod ISO, 23° C. | $kJ/m^2$ | 10 | 9 | 10 | 9 | 37 | 66 | 69 |
| Notched Izod ASTM, 23° C. | J/m | 109 | 96 | 100 | 100 | 891 | 952 | 983 |
| MVFR | $cm^3$/10 min | 10.6 | 10.3 | 8.3 | 7.1 | 8.4 | 7.4 | 6.9 |
| MV at 280° C., 1500 1/s | Pa-s | 394 | 377 | 376 | 387 | 351 | 333 | 320 |
| MV at 300° C., 1500 1/s | Pa-s | 253 | 263 | 259 | 271 | 244 | 235 | 241 |
| Vicat—B/120 | ° C. | 116 | 118 | 118 | 118 | 116 | 116 | 116 |
| HDT—1.8 MPa | ° C. | 100 | 102 | 102 | 103 | 100 | 100 | 102 |
| SF—1000 bar—1.5 mm | Cm | 9.3 | — | 9.0 | — | — | — | 9.1 |
| SF—1600 bar—1.5 mm | Cm | 13.4 | — | 12.5 | — | — | — | 12.9 |
| SF—2200 bar—1.5 mm | Cm | 18.2 | — | 16.2 | — | — | — | 16.7 |
| SF—1000 bar—3 mm | Cm | 15.5 | — | 16.6 | — | — | — | 17.0 |
| SF—1600 bar—3 mm | Cm | 25.0 | — | 26.1 | — | — | — | 26.9 |
| SF—2200 bar—3 mm | Cm | 38.0 | — | 37.9 | — | — | — | 39.0 |

The data in Table 3 shows that similar results are observed with a combination of PC-Si-ITR and a different flame retardant (FR-2). The addition of up to 40 wt % of a branched polycarbonate (PC-1) in a PC-Si-ITR and flame retardant (FR-2) combination lowers the impact resistance of the combination (compare CEx1 with CEx8 to CEx10) Adding 10 wt % of a bisphenol A polycarbonate-dimethylsiloxane copolymer (PC-Si) greatly enhances the impact resistance as shown in Ex11 to Ex13. Although the MVFR decreases, the thinning effect under shear, as seen by comparing the melt viscosity and spiral flow, means that the compositions of Ex11 to Ex13 are still suitable for use in injection molding applications.

Examples 14-20

Exemplary compositions (Ex18 to Ex20) and comparative compositions (CEx14 to CEx17), were tested for impact resistance, flow, and heat properties. The formulations and the results are shown in Table 4.

The data in Table 4 shows that the addition of up to 40 wt % of a low molecular weight linear polycarbonate homopolymer (PC-2) to a PC-Si-ITR/FR-1 combination significantly improves flow and lowers melt viscosity, but the ASTM notched impact resistance and the ductility at low temperature are negatively influenced with increasing PC-2 content (compare CEx14 with CEX15 to CEx17). The addition of 10 wt % of polydimethylsiloxane-bisphenol A polycarbonate copolymer (PC-Si) with or without PC-2 (Ex18 to Ex20) greatly enhances the impact resistance and ductility. The absence or addition of the PC-2 (Ex18 vs. Ex19-20) allows the flow and viscosity to be adjusted. Hence the balance of impact resistance, ductility, OSU heat compliance and tunable viscosity makes these compositions (Ex18-Ex20) ideal for aircraft interiors applications.

Examples 21-26

Exemplary compositions (Ex25 and Ex26) and comparative compositions (CEx21 to CEx24 were tested for impact, flow, and heat properties. The formulations and the results are shown in Table 5.

TABLE 4

| Component | Unit | CEx14 | CEx15 | CEx16 | CEx17 | Ex18 | Ex19 | Ex20 |
|---|---|---|---|---|---|---|---|---|
| PC-Si-ITR | Wt % | 93.44 | 73.44 | 63.44 | 53.44 | 83.44 | 73.44 | 63.44 |
| PEPQ | Wt % | 0.06 | 0.06 | 0.06 | 0.06 | 0.06 | 0.06 | 0.06 |
| FR-1 | Wt % | 6.5 | 6.5 | 6.5 | 6.5 | 6.5 | 6.5 | 6.5 |
| PC-Si | Wt % | | | | | 10 | 10 | 10 |
| PC-2 (linear) | Wt % | | 20 | 30 | 40 | | 10 | 20 |
| Property | | | | | | | | |
| Notched Izod ISO, 23° C. | $kJ/m^2$ | 9 | 8 | 8 | 7 | 23 | 30 | 61 |
| Notched Izod ASTM, 23° C. | J/m | 94 | 94 | 84 | 71 | 831 | 825 | 858 |
| MAI Ductility, 23° C. | % | 100 | 100 | 100 | 75 | 100 | 100 | 100 |
| MAI Ductility, 0° C. | % | 100 | 80 | 20 | 0 | 100 | 100 | 100 |
| MVFR | $cm^3$/10 min | 9.7 | 13.3 | 16.4 | 34.2 | 6.8 | 9.5 | 13.1 |
| MV at 280° C., 1500 1/s | Pa-s | 423 | 289 | 241 | 181 | 440 | 314 | 254 |
| MV at 300° C., 1500 1/s | Pa-s | 254 | 163 | 140 | 100 | 278 | 196 | 162 |
| Vicat—B/120 | ° C. | 112 | 113 | 115 | 112 | 110 | 111 | 113 |
| HDT—1.8 MPa—Flat | ° C. | 96 | 97 | 100 | 96 | 95 | 95 | 97 |

TABLE 5

| Component | Unit | CEx21 | CEx22 | CEx23 | CEx24 | Ex25 | Ex26 |
|---|---|---|---|---|---|---|---|
| PC-Si-ITR | % | 92.44 | 72.44 | 62.44 | 82.44 | 72.44 | 62.44 |
| PEPQ | % | 0.06 | 0.06 | 0.06 | 0.06 | 0.06 | 0.06 |
| FR-2 | % | 7.5 | 7.5 | 7.5 | 7.5 | 7.5 | 7.5 |
| PC-Si | % | | | | 10 | 10 | 10 |
| PC-2 | % | | 20 | 30 | | 10 | 20 |
| Property | | | | | | | |
| Notched Izod ISO, 23° C. | kJ/m² | 9 | 9 | 7 | 58 | 31 | 49 |
| Notched Izod ASTM, 23° C. | J/m | 103 | 94 | 86 | 890 | 777 | 834 |
| MAI Ductility, 23° C. | % | 100 | 100 | 100 | 100 | 100 | 100 |
| MAI Ductility 0° C. | % | 100 | 40 | 20 | 100 | 100 | 100 |
| MVFR | cm³/10 min | 10.0 | 14.3 | 19.1 | 8.7 | 10.6 | 13.6 |
| MV at 280° C., 1500 1/s | Pa-s | 386 | 268 | 211 | 310 | 255 | 219 |
| MV at 300° C., 1500 1/s | Pa-s | 258 | 161 | 128 | 244 | 192 | 154 |
| Vicat—B/120 | ° C. | 115 | 116 | 115 | 115 | 115 | 114 |
| HDT—1.8 MPa—Flat | ° C. | 100 | 99 | 100 | 99 | 98 | 99 |

Similar results can be observed for a combination containing PC-Si-ITR and an alternative aromatic organophosphorus compound (FR-2). The data in Table 5 shows that the addition of up to 40% of a low molecular weight polycarbonate homopolymer (PC-2) to a PC-Si-ITR/FR-2 combination significant lowers the viscosity and improves flow but the ASTM notched impact resistance and the ductility at low temperature are negatively influenced. (CEx 21-CEx 24) The addition of 10% of polydimethylsiloxane-bisphenol A polycarbonate copolymer (PC-Si) greatly enhances the impact and ductility properties. The balance of impact resistance, ductility, OSU heat compliance and tunable viscosity makes these compositions (Ex 25 and Ex 26) ideal for aircraft interiors applications.

Examples 27-32

Exemplary compositions (Ex29 to Ex32) and comparative compositions (CEx27 to CEx28), were tested for impact, flow, heat, and OSU performance. The formulations and the results are shown in Table 6.

TABLE 6

| Component | Unit | CEx27 | Ex29 | Ex30 | CEx28 | Ex31 | Ex32 |
|---|---|---|---|---|---|---|---|
| PC-Si-ITR | % | 93.44 | 63.44 | 63.44 | 93.44 | 63.44 | 63.44 |
| PEPQ | % | 0.06 | 0.06 | 0.06 | 0.06 | 0.06 | 0.06 |
| FR-1 | % | 6.5 | 6.5 | 6.5 | 6.5 | 6.5 | 6.5 |
| PC-Si | % | | 10 | 10 | | 10 | 10 |
| PC-1 | % | | 20 | | | 20 | |
| PC-2 | % | | | 20 | | | 20 |
| TiO₂ | % | 1.792 | 1.792 | 1.792 | 1 | 1 | 1 |
| SR 135 MB | % | 0.004 | 0.004 | 0.004 | | | |
| PB 28 MB | % | 0.265 | 0.265 | 0.265 | | | |
| CB | % | | | | 0.036 | 0.036 | 0.036 |
| SV 36 | % | | | | 0.056 | 0.056 | 0.056 |
| SB 104 | % | | | | 0.062 | 0.062 | 0.062 |
| PB 15:4 | % | | | | 0.03 | 0.03 | 0.03 |
| Property | | | | | | | |
| Notched Izod ASTM, 23° C. | J/m | 142 | 988 | 781 | 135 | 878 | 780 |
| Izod ASTM Ductility, 23° C. | % | 0 | 100 | 100 | 0 | 100 | 100 |
| OSU HR 2 min peak | | Pass | Pass | Pass | Pass | Pass | Pass |
| Vertical Burn | | Pass | Pass | Pass | Pass | Pass | Pass |
| FAR 25.853 (d) smoke density | DS-4 | 47 | 100 | 107 | 53 | 122 | 133 |

The data in Table 6 shows that a combination of PC-Si-ITR with FR-1 (CEx27 and CEx28) has good heat release properties, but poor Izod ASTM impact resistance and 0% ASTM ductility. With the addition of 10 wt % of PC-Si and 20 wt % of either PC-1 (branched) or PC-2 (linear), the compositions (Ex29 to Ex32) have greatly improved impact (by a factor of 6-7) yet still maintaining the good heat release properties, flame spread and smoke density compliancy. Best impact is obtained with use of a branched bisphenol A homopolycarbonate. The data also indicates that the compositions of the disclosure can be formulated to have different colors.

Set forth are various aspects of the disclosure.

Aspect 1. A thermoplastic composition comprising: 40 to 75 wt % of a poly(carbonate-siloxane-arylate); 5 to 45 wt % of a poly(carbonate-siloxane) present in an amount effective to provide 0.75 to 7 wt % of siloxane units; 10 to 40 wt % of a polycarbonate homopolymer; 5 to 15 wt % of an organophosphorus compound in an amount effective to provide 0.1 to 1 wt % of phosphorus; and optionally, 0.1 to 10 wt % of an additive composition, wherein each amount is based on the total weight of the poly(carbonate-siloxane-arylate), poly(carbonate-siloxane), polycarbonate homopolymer, flame retardant, and optional additive composition, which does not exceed 100%; and wherein the thermoplastic composition has a melt volume flow rate of greater than 6 cm³/10 min when measured in accordance with the ISO-1133-1:2011 standard at 300° C. under a load of 1.2 kg with a residence time of 300 seconds; and an article molded from the thermoplastic composition has a 2-minute integrated heat release rate of less than or equal to 65 kW-min/m² and a peak heat release rate of less than 65 kW/m² as measured using the method according to Part IV, OSU Heat Release of FAR/JAR 25.853, Amendment 25-116; and a notched Izod impact resistance of greater than 30 kJ/m² determined in accordance with ISO 180:2000 on notched 4 millimeter thick ISO bars at 23° C., with a 5.5 J hammer; a notched Izod impact resistance of greater than 700 J/m² measured on notched 3.2 mm bars at 23° C., in accordance with the ASTM-D256-10 (2018) standard.

Aspect 2. The thermoplastic composition of Aspect 1, wherein the poly(carbonate-siloxane-arylate) comprises: 0.2 to 10 wt % of siloxane units based on the total weight of the poly(carbonate-siloxane-arylate); 50 to 99.6 mol % arylate units, and 0.2 to 49.8 mol % carbonate units, each based on the sum of the moles of the siloxane units, the arylate units, and carbonate units in the poly(carbonate-siloxane-arylate); preferably wherein the arylate units are isophthalate-terephthalate-resorcinol ester units; the carbonate units are bisphenol A carbonate units, resorcinol carbonate units, or a combination thereof; and the siloxane units are polydimethylsiloxane units.

Aspect 3. The thermoplastic composition of any of the preceding Aspects, wherein the poly(carbonate-siloxane) comprises bisphenol A carbonate units and polydimethylsiloxane units. The poly(carbonate-siloxane) has a siloxane content of 5 to 45 wt %, 5 to 30 wt %, or 10 to 30 wt %, preferably 15 to 25 wt %, more preferably 17 to 23 wt %, each based on the total weight of the poly(carbonate-siloxane). The poly(carbonate-siloxane) has an Mw of 28,000 to 32,000 Dalton (Da), preferably 29,000 to 31,000 Da as measured by gel permeation chromatography using a crosslinked styrene-divinyl benzene column, at a sample concentration of 1 milligram per milliliter, and as calibrated with bisphenol A polycarbonate standards.

Aspect 4. The thermoplastic composition of any of the preceding Aspects, wherein the polycarbonate homopolymer comprises a linear bisphenol A polycarbonate homopolymer having a weight average molecular weight of 15,000 to 20,000 Dalton, as measured by gel permeation chromatography (GPC) using a crosslinked styrene-divinylbenzene column and calibrated to bisphenol A polycarbonate references.

Aspect 5. The thermoplastic composition of any of the preceding Aspects, wherein the polycarbonate homopolymer comprises a branched polycarbonate comprising bisphenol A carbonate units and moieties derived from a branching agent comprising trimellitic acid, trimellitic anhydride, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, benzophenone tetracarboxylic acid, or a combination thereof.

Aspect 6. The thermoplastic composition of Aspect 5, wherein the branched polycarbonate comprises bisphenol A carbonate units and 3 to 10 mol %, based on the total moles of the branched polycarbonate, of a moiety derived from 1,1,1-tris(4-hydroxyphenyl)ethane; and optionally the branched polycarbonate has a weight average molecular weight of 28,000 to 40,000 Dalton, as measured by gel permeation chromatography (GPC) using a crosslinked styrene-divinylbenzene column and calibrated to bisphenol A polycarbonate references.

Aspect 7. The thermoplastic composition of any of the preceding Aspects, wherein the aromatic organophosphorus compound is of the formula

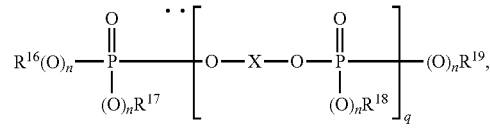

wherein $R^{16}$, $R^{17}$, $R^{18}$ and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, and X is a mono- or poly-nuclear aromatic $C_{6-30}$ moiety or a linear or branched $C_{2-30}$ aliphatic moiety, each of which can be OH-substituted and can contain up to 8 ether bonds, provided that at least one of $R^{16}$, $R^{17}$, $R^{18}$, $R^{19}$, and X is aromatic, n is each independently 0 or 1, and q is from 0.5 to 30; preferably wherein each of $R^{16}$, $R^{17}$, $R^{18}$, and $R^{19}$ is phenyl, X is of the formula

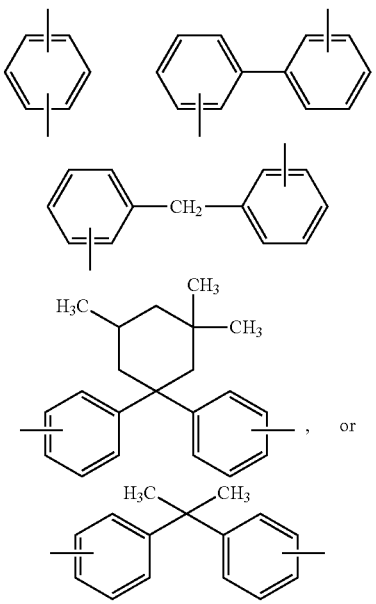

each n is 1, and q is 1-5.

Aspect 8. The thermoplastic composition of any of preceding Aspects, wherein the aromatic organophosphorus compound is of the formula

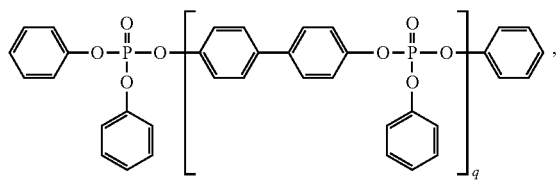

wherein q is 1 to 5.

Aspect 9. The thermoplastic composition of any of preceding Aspects, comprising 60 to 65 wt % of the poly(carbonate-siloxane-arylate), wherein the poly(carbonate-siloxane-arylate) comprises, based on the total weight of the poly(carbonate-siloxane-arylate) 0.2 to 10 wt % of siloxane units of the formula

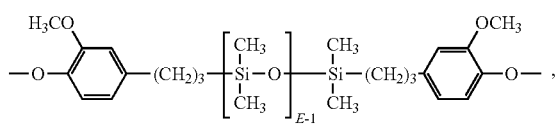

wherein E has an average value of 5 to 20, 50 to 99.6 mol % isophthalate-terephthalate-resorcinol ester units, and 0.2 to 49.8 mol % bisphenol A carbonate units; 5 to 15 wt % of the poly(carbonate-siloxane), wherein the poly(carbonate-siloxane) has a siloxane content of 15 to 25 wt % based on the total weight of the poly(carbonate-siloxane), and comprises bisphenol A carbonate units, and siloxane units of the formula

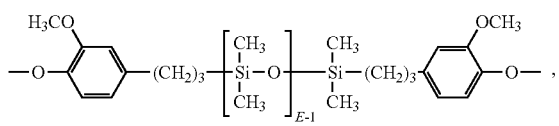

wherein E has an average value of 20 to 80; and 15 to 25 wt % of the polycarbonate homopolymer, wherein the polycarbonate homopolymer comprises a branched polycarbonate comprising bisphenol A carbonate units and 3 to 10 mol %, based on the total moles of the branched polycarbonate, of a moiety derived from 1,1,1-tris(4-hydroxyphenyl)ethane, and endcapping groups derived from p-cyanophenol; and the branched polycarbonate has a weight average molecular weight of 30,000 to 35,000 Dalton, as measured by gel permeation chromatography (GPC) using a crosslinked styrene-divinylbenzene column and calibrated to bisphenol A polycarbonate references; 5 to 8 wt % of the organophosphorus compound, wherein the organophosphorus compound has the formula

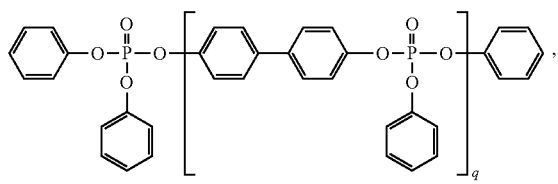

wherein q is 1 to 5; and 0.1 to 3 wt % of the additive composition, wherein the additive composition comprises a mold release agent and a heat stabilizer.

Aspect 10. The thermoplastic composition of any of Aspects 1 to 8, comprising 60 to 65 wt % of the poly(carbonate-siloxane-arylate), wherein the poly(carbonate-siloxane-arylate) comprises, based on the total weight of the poly(carbonate-siloxane-arylate), 0.2 to 10 wt % of siloxane units of the formula

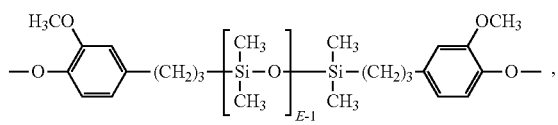

wherein E has an average value of 5 to 20, 50 to 99.6 mol % isophthalate-terephthalate-resorcinol ester units, and 0.2 to 49.8 mol % bisphenol A carbonate units; 5 to 15 wt % of the poly(carbonate-siloxane), wherein the poly(carbonate-siloxane) has a siloxane content of 15 to 25 wt % based on the total weight of the poly(carbonate-siloxane), and comprises bisphenol A carbonate units, and siloxane units of the formula

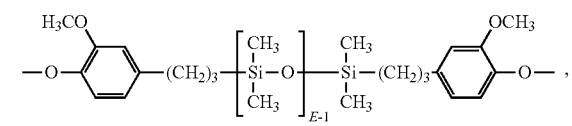

wherein E has an average value of 20 to 80; 15 to 25 wt % of the polycarbonate homopolymer, wherein the polycarbonate homopolymer comprises a linear bisphenol A polycarbonate homopolymer having a weight average molecular weight of 15,000 to 20,000 Dalton, as measured by gel permeation chromatography (GPC) using a crosslinked styrene-divinylbenzene column and calibrated to bisphenol A polycarbonate references; 5 to 8 wt % of the organophosphorus compound, based on the total weight of the thermoplastic composition wherein the organophosphorus compound has the formula

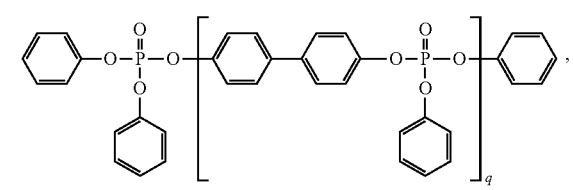

wherein q is 1 to 5 to 5; and 0.1 to 3 wt % of the additive composition, wherein the additive composition comprises a mold release agent and a heat stabilizer.

Aspect 11. The thermoplastic composition of any of preceding Aspects, further comprising a mineral filler, glass, carbon, or a combination comprising at least one of the foregoing; and optionally wherein the mineral filler, glass, carbon, or a combination comprising at least one of the foregoing are present in an amount of 5 to 45 wt %, based on the total weight of the thermoplastic composition.

Aspect 12. A powder, filament, or composite comprising the thermoplastic composition of any of preceding Aspects.

Aspect 13. A composite comprising the thermoplastic composition of any of Aspects 1 to 11, and a fibrous material comprising glass fiber, carbon fiber, basalt fiber; optionally wherein the fibrous material is a woven fiber, a non-woven fiber, or a uni-directional fiber tape.

Aspect 14. An article comprising the composition of any of Aspects 1 to 13, selected from a molded article, a thermoformed article, an extruded film, an extruded sheet, a foamed article, a layer of a multi-layer article, a substrate for a coated article, and a substrate for a metallized article, preferably wherein the article is an aircraft interior component.

Aspect 15. A method of manufacture of an article, the method comprising additively manufacturing the article using a powder or filament comprising the thermoplastic compositions of any one of Aspects 1 to 11.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising: 40 to 75 wt % of a poly(carbonate-siloxane-arylate);
    5 to 45 wt % of a poly(carbonate-siloxane) present in an amount effective to provide 0.75 to 7 wt % of siloxane units;
    10 to 40 wt % of a polycarbonate homopolymer;
    5 to 15 wt % of an organophosphorus compound in an amount effective to provide 0.1 to 1 wt % of phosphorus; and
    optionally, 0.1 to 10 wt % of an additive composition, wherein each amount is based on the total weight of the poly(carbonate-siloxane-arylate), poly(carbonate-siloxane), polycarbonate homopolymer, flame retardant, and optional additive composition, which does not exceed 100%; and
    Wherein
        the thermoplastic composition has a melt volume flow rate of greater than 6 cm³/10 min when measured in accordance with the ISO-1133-1:2011 standard at 300° C. under a load of 1.2 kg with a residence time of 300 seconds; and
        an article molded from the thermoplastic composition has
        a 2-minute integrated heat release rate of less than or equal to 65 kW-min/m² and a peak heat release rate of less than 65 kW/m² as measured using the method according to Part IV, OSU Heat Release of FAR/JAR 25.853,
        Amendment 25-116; and
        a notched Izod impact resistance of greater than 30 KJ/m2 determined in accordance with ISO 180:2000 on notched 4 millimeter thick ISO bars at 23° C., with a 5.5 J hammer;
        a notched Izod impact resistance of greater than 700 J/m2 measured on notched 3.2 mm bars at 23° C., in accordance with the ASTM-D256-10 (2018) standard.

2. The thermoplastic composition of claim 1, wherein the poly(carbonate-siloxane-arylate) comprises:
    0.2 to 10 wt % of siloxane units based on the total weight of the poly(carbonate-siloxane-arylate);
    50 to 99.6 mol % arylate units, and
    0.2 to 49.8 mol % carbonate units, each based on the sum of the moles of the siloxane units, the arylate units, and carbonate units in the poly(carbonate-siloxane-arylate).

3. The thermoplastic composition of claim 1, wherein the poly(carbonate-siloxane) comprises bisphenol A carbonate units and polydimethylsiloxane units.

4. The thermoplastic composition of claim 1, wherein the polycarbonate homopolymer comprises a linear bisphenol A polycarbonate homopolymer having a weight average molecular weight of 15,000 to 20,000 Dalton, as measured by gel permeation chromatography (GPC) using a crosslinked styrene-divinylbenzene column and calibrated to bisphenol A polycarbonate references.

5. The thermoplastic composition of claim 1, wherein the polycarbonate homopolymer comprises a branched polycarbonate comprising bisphenol A carbonate units and moieties derived from a branching agent comprising trimellitic acid, trimellitic anhydride, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, benzophenone tetracarboxylic acid, or a combination thereof.

6. The thermoplastic composition of claim 5, wherein the branched polycarbonate comprises bisphenol A carbonate units and 3 to 10 mol %, based on the total moles of the branched polycarbonate, of a moiety derived from 1,1,1-tris (4-hydroxyphenyl)ethane; and optionally the branched polycarbonate has a weight average molecular weight of 28,000 to 40,000 Dalton, as measured by gel permeation chromatography (GPC) using a crosslinked styrene-divinylbenzene column and calibrated to bisphenol A polycarbonate references.

7. The thermoplastic composition of claim 1, wherein the aromatic organophosphorus compound is of the formula

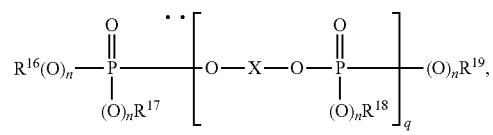

wherein
    $R^{16}$, $R^{17}$, $R^{18}$ and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, and
    X is a mono- or poly-nuclear aromatic $C_{6-30}$ moiety or a linear or branched $C_{2-30}$ aliphatic moiety, each of which can be OH-substituted and can contain up to 8 ether bonds, provided that at least one of $R^{16}$, $R^{17}$, $R^{18}$, $R^{19}$, and X is aromatic,
    n is each independently 0 or 1, and
    q is from 0.5 to 30.

8. The thermoplastic composition of claim 1, wherein the aromatic organophosphorus compound is of the formula

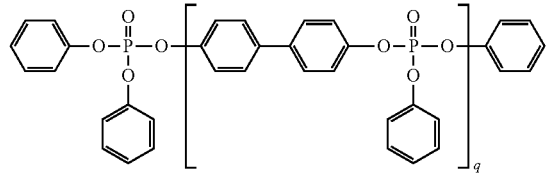

wherein q is 1 to 5.

9. The thermoplastic composition of claim 1, comprising
    60 to 65 wt % of the poly(carbonate-siloxane-arylate), wherein the poly(carbonate-siloxane-arylate) comprises, based on the total weight of the poly(carbonate-siloxane-arylate)
    0.2 to 10 wt % of siloxane units of the formula

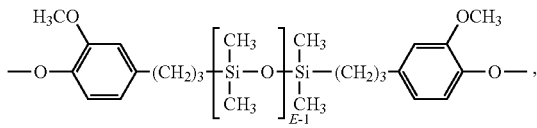

wherein E has an average value of 5 to 20,
    50 to 99.6 mol % isophthalate-terephthalate-resorcinol ester units, and
    0.2 to 49.8 mol % bisphenol A carbonate units;
    5 to 15 wt % of the poly(carbonate-siloxane), wherein the poly(carbonate-siloxane) has a siloxane content of 15 to 25 wt % based on the total weight of the poly (carbonate-siloxane), and comprises
        bisphenol A carbonate units, and siloxane units of the formula

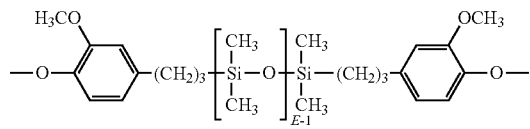

wherein E has an average value of 20 to 80; and
15 to 25 wt % of the polycarbonate homopolymer, wherein the polycarbonate homopolymer comprises a branched polycarbonate comprising bisphenol A carbonate units and 3 to 10 mol %, based on the total moles of the branched polycarbonate, of a moiety derived from 1,1,1-tris(4-hydroxyphenyl)ethane, and endcapping groups derived from p-cyanophenol; and the branched polycarbonate has a weight average molecular weight of 30,000 to 35,000 Dalton, as measured by gel permeation chromatography (GPC) using a crosslinked styrene-divinylbenzene column and calibrated to bisphenol A polycarbonate references;
5 to 8 wt % of the organophosphorus compound, wherein the organophosphorus compound has the formula

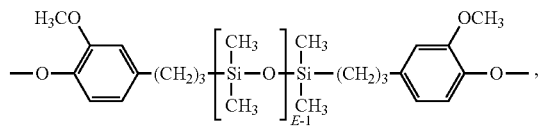

wherein q is 1 to 5; and
0.1 to 3 wt % of the additive composition, wherein the additive composition comprises a mold release agent and a heat stabilizer.

10. The thermoplastic composition of claim 1, comprising 60 to 65 wt % of the poly(carbonate-siloxane-arylate), wherein the poly(carbonate-siloxane-arylate) comprises, based on the total weight of the poly(carbonate-siloxane-arylate),
0.2 to 10 wt % siloxane units of the formula

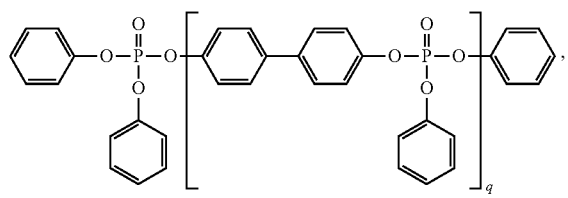

wherein E has an average value of 5 to 20,
50 to 99.6 mol % isophthalate-terephthalate-resorcinol ester units, and
0.2 to 49.8 mol % bisphenol A carbonate units;
5 to 15 wt % of the poly(carbonate-siloxane), wherein the poly(carbonate-siloxane) has a siloxane content of 15 to 25 wt % based on the total weight of the poly(carbonate-siloxane), and comprises bisphenol A carbonate units, and siloxane units of the formula

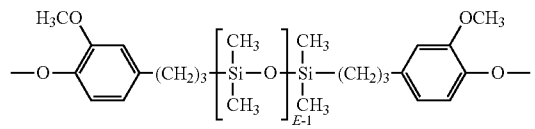

wherein E has an average value of 20 to 80;
15 to 25 wt % of the polycarbonate homopolymer, wherein the polycarbonate homopolymer comprises a linear bisphenol A polycarbonate homopolymer having a weight average molecular weight of 15,000 to 20,000 Dalton, as measured by gel permeation chromatography (GPC) using a crosslinked styrene-divinylbenzene column and calibrated to bisphenol A polycarbonate references;
5 to 8 wt % of the organophosphorus compound, based on the total weight of the thermoplastic composition wherein the organophosphorus compound has the formula

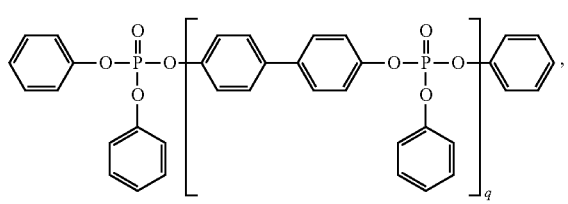

wherein q is 1 to 5 to 5; and
0.1 to 3 wt % of the additive composition, wherein the additive composition comprises a mold release agent and a heat stabilizer.

11. The thermoplastic composition of claim 1, further comprising a mineral filler, glass, carbon, or a combination comprising at least one of the foregoing; and optionally wherein the mineral filler, glass, carbon, or a combination comprising at least one of the foregoing are present in an amount of 5 to 45 wt %, based on the total weight of the thermoplastic composition.

12. A powder, filament, or composite comprising the thermoplastic composition of claim 1.

13. A composite comprising the thermoplastic composition of claim 1, and a fibrous material comprising glass fiber, carbon fiber, basalt fiber; optionally wherein the fibrous material is a woven fiber, a non-woven fiber, or a unidirectional fiber tape.

14. An article comprising the composition of claim 1, selected from a molded article, a thermoformed article, an extruded film, an extruded sheet, a foamed article, a layer of a multi-layer article, a substrate for a coated article, and a substrate for a metallized article.

15. A method of manufacture of an article, the method comprising additively manufacturing the article using a powder or filament comprising the thermoplastic compositions of claim 1.

* * * * *